United States Patent Office 3,449,107
Patented June 10, 1969

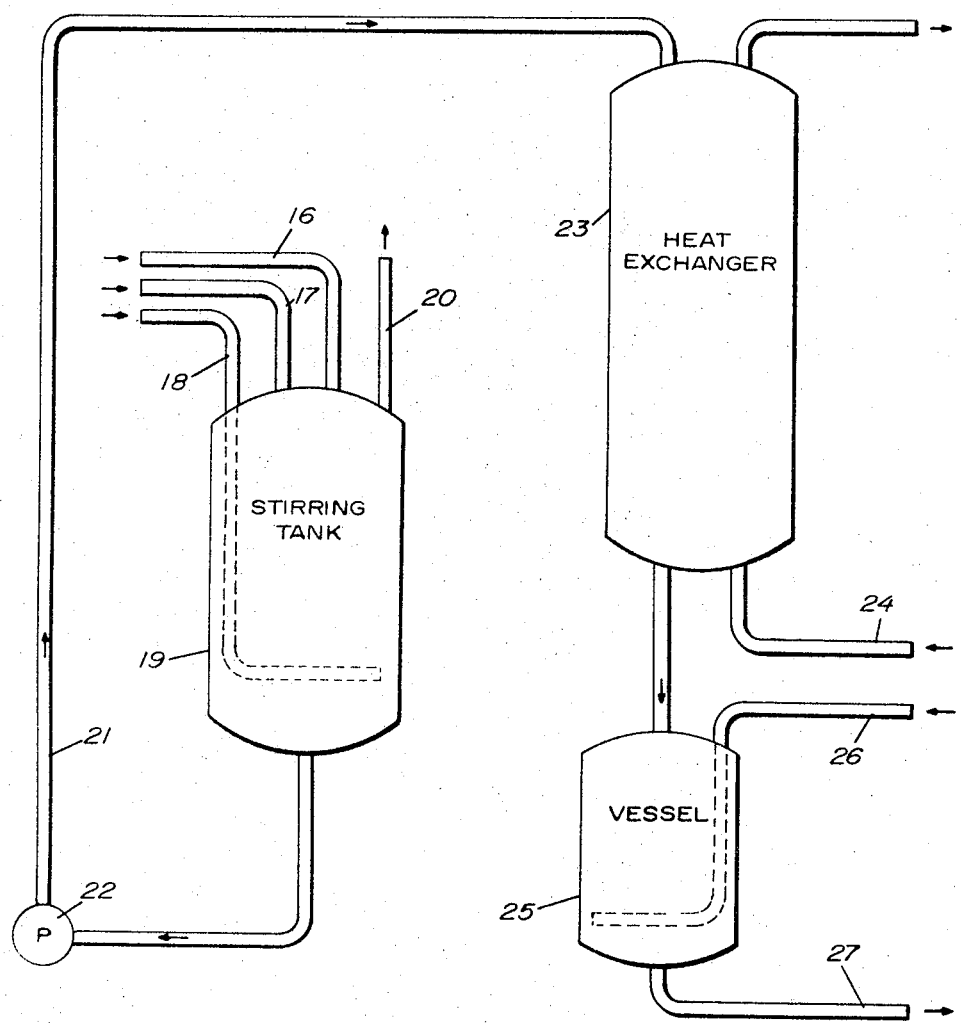

3,449,107
PROCESS FOR PREPARING MELTS COMPRISING AMMONIUM NITRATE AND PHOSPHATE
John Dickinson Chapman, Geoffrey Thomas Dee, Stanislaw Maria Janikowski, and Roger Hugh Peters, Suffolk, England, assignors to Fisons Fertilizers Limited, Suffolk, England
Filed Sept. 10, 1965, Ser. No. 486,569
Claims priority, application Great Britain, Sept. 23, 1964, 38,747/64
Int. Cl. C05g 1/02
U.S. Cl. 71—36        8 Claims

ABSTRACT OF THE DISCLOSURE

A process for forming liquid melts containing ammonium nitrate and ammonium phosphate wherein the water content of an acid mixture containing nitrate, phosphate and ammonium ions is reduced from a value in the range 1.3% to 20% to a value of less than 2% by weight, by passing air through the acid mixture and then treating the dry or almost dry acid mixture with ammonium gas.

---

Figure 1:
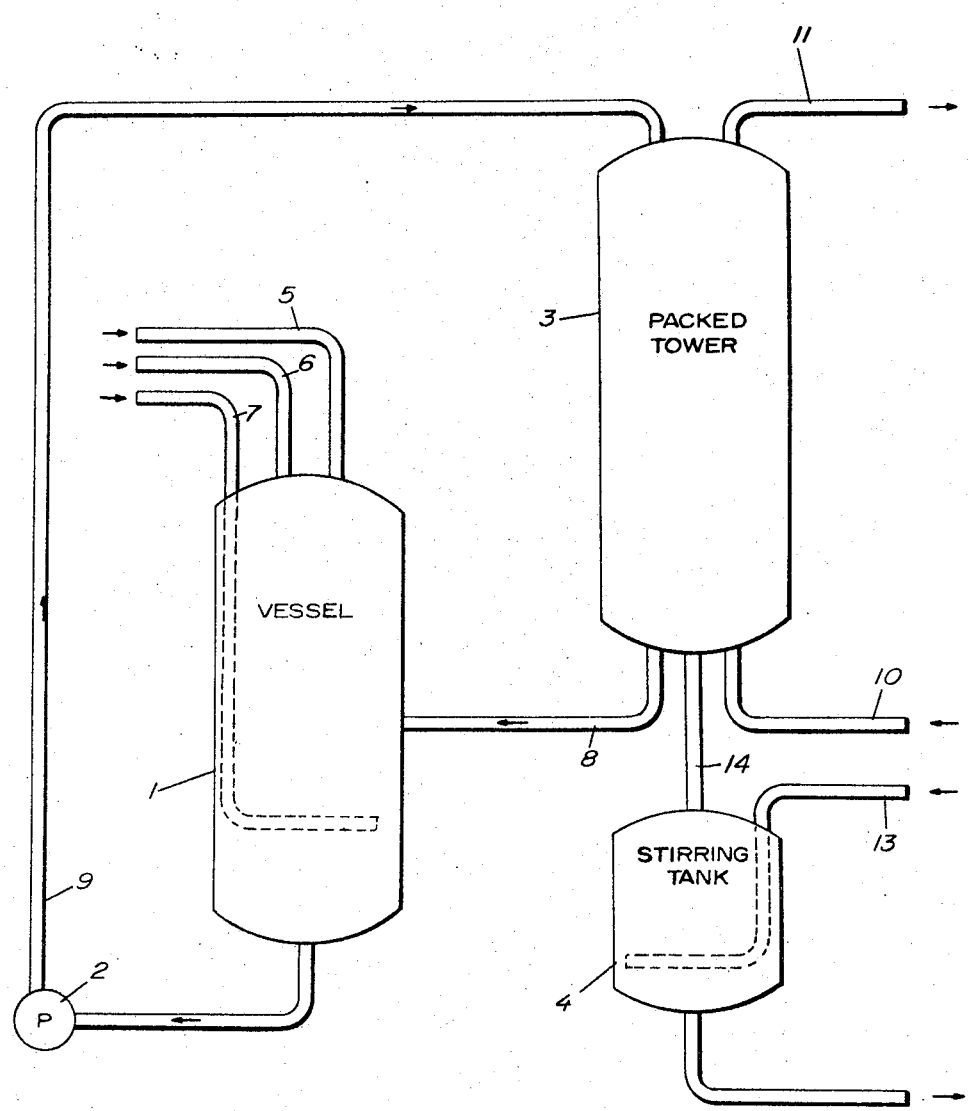

The present invention relates to the preparation of liquid melts of ammonium phosphate nitrate containing little or no moisture.

Surprisingly it has been found that acid melts containing phosphate and nitrate ions at water levels in the range 0% to 2% by weight will absorb ammonia very readily even to the extent of forming mixtures containing ammonium nitrate and and ammonium phosphate wherein the ammonium phosphate is present largely or wholly as diammonium phosphate. An advantage of this is that since the ammoniation is so readily carried out only small equipment is necessary.

Accordingly the present invention provides a process for preparing liquid melts comprising ammonium nitrate and ammonium phosphate wherein the ammonium phosphate has an N:P atomic ratio of from 0.9:1 to 2.0:1 and the melt has an N:$P_2O_5$ weight ratio of from 0.3:1 to 4.1:1 which comprises treating an acid mixture containing nitrate ions, phosphate ions, ammonium ions, hydrogen ions and 0 to 2% preferably 0.1 to 1,2% by weight of water, at a pH of 2.0 to 3.0, preferably at a pH of 2.2 to 2.8, and at a temperature of 120° C. to 200° C. with gaseous ammonia until the desired N:$P_2O_5$ weight ratio is attained. In this specification the N:$P_2O_5$ ratio is based on the N content of the ammonium nitrate and the ammonium phosphate and the $P_2O_5$ content of the ammonium phosphate.

The acid mixture may be treated with ammonia until a pH of 3.5 to 8.0, preferably a pH of 4.0 to 7.0, is attained. If the ammonium phosphate is to be presented as diammonium phosphate the treatment is continued until a pH of 8.0 is reached, but desirably the maximum N:P atomic ratio is 1.75:1 corresponding to a pH of 7.0. It should be noted that in this specification the pH referred to its the pH of one part by weight of material diluted with 9 parts by weight of water.

Desirably the acid mixture is treated with gaseous anhydrous ammonia at as low a temperature as practicable, that is somewhere in the range 150° C. to 185° C., since at these low temperatures a high degree of ammoniation is possible and the product melt requires less cooling before solidification occurs thereby reducing loss of ammonia during cooling. The acid mixture may also be treated with ammonia at a pressure greater than atmospheric pressure. In general it is desirable to treat the acid mixture with ammonia in such a way that the vapor pressure of ammonia and water vapour over the reaction mixtures does not exceed one atmosphere.

In treating the acid mixture of low water content with ammonia heat is evolved and in certain conditions this heat may be excessive. If this is so any conventional form of cooling may be used or alternatively cooled product of the process of the present invention may be added to the melt to maintain the temperature between 150° C., and 185° C.

Treatment of the acid mixture of low water content with ammonia may be performed in any convenient form of apparatus. For example the ammoniation may be performed in a gas/liquid contact column or merely in a feed line. Preferably the treatment of the acid mixture with ammonia takes place in a tank reactor in which case the acid mixture is treated with ammonia in the presence of previously formed melt.

It has been found that the water content of acid mixtures containing nitrate ions phosphate ions, ammonium ions and hydrogen ions at a pH of 2.0 to 3.0 and a temperature of 120° to 200° C. can be reduced to levels in the range 0–2% more effectively than similar mixtures at pHs outside the range 2.0 to 3.0 by passing air through the acid mixture or by subjecting the acid mixture to sub-atmospheric pressure at least while the water content is being reduced below 3% by weight. In particular by operating at this pH level it is possible to reduce considerably the loss of nitrogen as nitrogen oxides, ammonia and nitric acid. Taking advantage of this discovery together with the discovery that acid melts at water levels in the range 0% to 2% by weight of water will readily absorb ammonia at relatively low temperatures, a very convenient method of preparing liquid melts comprising ammonium phosphate nitrate can be achieved.

Accordingly a further embodiment of the present invention provides a process for preparing liquid melts comprising ammonium nitrate and ammonium phosphate wherein the ammonium phosphate has an N:P atomic ratio of from 0.9:1 to 2:1 and the melt has an N:$P_2O_5$ weight ratio of from 0.3:1 to 4.1:1 which comprises forming an acid mixture containing nitrate ions, phosphate ions, ammonium ions and hydrogen ions and 1.3% to 20% by weight of water at a temperature of 130° to 200° C. and a pH of 2.0 to 3.0 preferably a pH of 2.2 to 2.8, reducing the water content of the mixture to a level in the range 0% to 2%, preferably to a level in the range 0.1% to 1.2% by weight based on the weight of the mixture wherein the water is removed, at least when the water content is below 3% by weight, by passing air through the mixture or subjecting the mixture to a sub-atmospheric pressure, preferably of 20 to 300 millimeters of mercury absolute, while maintaining the temperature of the mixture above its crystallisation point and finally treating the water-reduced mixture at a temperature of 120° C. to 200° C. preferably at a temperature of 150° to 180° C., with gaseous ammonia until the desired N:$P_2O_5$ weight ratio is reached. While the water content is above 3% by weight the water content may be reduced by any means such as, for example, by boiling at atmospheric pressure.

The mixture containing ammonium ions, nitrate ions, phosphate ions, hydrogen ions and 1.3% to 20% by weight water may be formed in a number of ways.

For instance this mixture may be formed by a process which comprises treating with gaseous ammonia an acid mixture containing a nitrate component selected from ammonium nitrate and nitric acid, a phosphate comonent selected from ammonium phosphate and phosphoric acid and water, at least one of the acids being present, the treatment preferably taking place in the presence of previously reacted material. Preferably the acid mixture comprises ammonium nitrate and/or nitric acid and phosphoric acid. There may also be included in the acid mixture either part of the acid melt containing 0–2% by weight of water or part of the product of the present invention namely melt comprising ammonium phosphate nitrate this being desirable if the water content of the acid mixture would be otherwise too high. Additionally there may be included in the acid mixture sulphuric acid or ammonium sulphate.

The mixture containing ammonium ions, nitrate ions, phosphate ions, hydrogen ions and 1.3 to 20% by weight of water may also be formed by a process which comprises adding part of the product of the present invention, namely, melt comprising ammonium phosphate nitrate, to an acid mixture containing a nitrate component selected from ammonium nitrate and nitric acid, a phosphate component selected from mono- or diammonium phosphate and phospheric acid and water, at least one of the acids being present. The acid mixture may also contain sulphuric acid or ammonium sulphate.

The mixture containing ammonium ions, nitrate ions, hydrogen ions and water may contain up to 20% by weight of water but preferably contains 1.5% to 15% by weight of water.

In using air to dehydrate the mixture of pH 2.0–3.0 it is preferred to use the air at a temperature high enough not to cool the melt to a temperature at which it is not liquid. For example, the temperature of the air should generally be above 150° C. The amount of air may be in the range 10% to 200% by weight of the melt.

A preferred embodiment of the present invention provides a process for the preparing melts comprising ammonium phosphate nitrate which comprises mixing 1.0 to 5.8 parts by weight of ammonium nitrate as an 80–95% solution in water at a temperature of 150° to 200° C. with 3.0 to 1.0 parts by weight of phosphoric acid as a solution containing 70–100% by weight $H_3PO_4$, optionally adding to the mixture part of the acid melt containing 0.2 to 1.0% by weight of water formed in this process, treating the resulting mixture with ammonia until a pH in the range 2.3 to 2.7 is attained, reducing the water content of the ammoniated mixture to a level in the range of 0.2 to 1.0% by weight by passing air through the ammoniated mixture at a temperature above 120° C. and finally treating the substantially dehydrated mixture with gaseous ammonia until a pH in the range 3.5 to 8.0 is attained thereby forming a melt comprising ammonium phosphate nitrate having a temperature in the range 150° C. to 185° C.

The melts of ammonium phosphate nitrate obtained by the process of the present invention may be formed into fertilizers either by prilling or granulating or converting into flakes or powders. Other fertilizer materials such as potassium salts, superphosphate, urea and trace elements may be added to the melt before or during the processing of the melt into prills, granules, flakes or powders. Alternatively, blends of the processed melts with other fertilizer materials may be made.

The process of the present invention is illustrated by the accompanying examples in which parts are by weight.

Example 1

The plant used is illustrated in FIG. 1, 25.1 parts/hour of wet process phosphoric acid (50% $P_2O_5$), 105.4 parts per hour of hot nitric acid (58% $HNO_3$) and 19.3 lb./hr. of ammonia gas were fed through lines 5, 6 and 7 respectively into the stirred stainless steel vessel 1, together with about 3,180 parts of dry acid melt, through line 8, from the packed tower 3.

The resultant acid melt contained 1.7% water, and had a pH of 2.5. This melt, at a temperature of 177° C., was fed through line 9 by means of a stainless centrifugal pump 2 into the packed tower 3, where it was contacted with 300 parts per hour of air at 189° C., fed through line 10, and flowing countercurrently to the melt.

The acid melt was dried by the air to a moisture content of 0.2% $H_2O$, the temperature simultaneously falling to 161° C., and the waste gases were extracted through exit line 11. 99.4 parts per hour of this melt were fed from packed tower 3 through pipe 14 into the stirring tank 4, where it was ammoniated through line 13 with 0.6 part per hour of ammonia to give a melt of pH 4.0. The heat of ammoniation raised the temperature in tank 4 to 280° C.

The melt at pH 4 was flaked on a water cooled stainless steel conveyor and broken into fragments in a disintegrator to give a product of $N:P_2O_5$ ratio 2:1. The product melt was blended with compacted muriate of potash to give a blended fertilizer analysing 24% N, 10% $P_2O_5$ and 10% $K_2O$.

Example 2

A 1:1:1 fertilizer wase prepared similarly to the 2.4:1:1 fertilizer described in Example 1, the feed and product quantities being as follows:

| | | |
|---|---|---|
| 58% $HNO_3$ | parts/hour | 74.6 |
| 50% $P_2O_5$ acid | do | 51.1 |
| Ammonia to vessel 1 | do | 17.0 |
| Temperature of acid melt in vessel 1 | ° C. | 171 |
| Temperature of acid melt at bottom of tower 3 | ° C. | 157 |
| Air to tower 3 | parts/hour | 300 |
| Air temperature at tower inlet | ° C. | 198 |
| Melt feed to tower 3 | parts/hour | 3,303 |
| Melt feed to vessel 4 | do | 98.8 |
| Ammonia feed to vessel 4 | do | 1.2 |
| Product 1:1 melt at pH 4, 196° C. | do | 100 |

Example 3

The plant used is illustrated in FIGURE 2

104 parts per day of wet process phosphoric acid (55% $P_2O_5$), 334 parts per day of 87.6% ammonium nitrate solution and 13.2 parts per day of ammonia were fed through lines 16, 17 and 18 respectively into stirred tank 19. The heat of ammoniation caused the mixture in the tank to boil, a temperature of 155° C. being reached. Steam from the tank 19 was passed to a scrubber through exit line 20.

The product from vessel 1, containing 8.0 parts of water was fed through line 21 into a heat exchanger tower 23 by means of the pump 22. Heat exchanger 23 consisted of a shell square in cross section, in which were fitted steam heated 1" O.D. stainless steel tubes in layers, each layer being at right angles to the ones above and below it. 430 parts per day of the mixture were fed at the top of the heat exchanger, 400 parts per day by weight of air at 165° C. being fed at the bottom through line 24.

The air and melt flowed countercurrently in the tower, the melt losing water until a moisture content of 0.8% was reached. The steam heating raised the temperature slightly to 165° C.

The melt at pH 2.5, 0.8% water was then fed to vessel 24 where it was ammoniated through line 26 to pH 4. The temperature of the melt was kept down to 160° C. by feeding into vessel 25 solid recycle fines from the process at a rate of 71 parts per day.

The melt at pH 4 was then fed through exit line 27 into a blunger, where it was mixed with 468 parts per day of recycled cold solid fines. The granules were then cooled and screened to give a product of an $N:P_2O_5$ ratio of 2:1 at a rate of 400 parts per day.

Example 4

A product of $N:P_2O_5$ ratio 1:1 was produced in a similar manner to the 2:1 product described in Example 3.

| The feed quantities were: | Parts per day |
|---|---|
| 55% $P_2O_5$ phosphoric acid | 178 |
| Ammonia | 75.2 |
| 89.7% AN solution | 246 |
| Air | 400 |
| Ammonia | 75.2 |

Melt temperatures were:

| | | |
|---|---|---|
| Reactor 1 | °C | 167 |
| Exchanger 3 | °C | 167 to 177 |
| Reactor 4 | °C | 170 |

| Recycle fines feeds were: | Parts per day |
|---|---|
| Reactor 4 | 146 |
| Blunger | 356 |
| 1:1 N:P$_2$O$_5$ product produced | 400 |

Example 5

300 parts of a 2.5:1 N:P$_2$O$_5$ melt at pH 2.5 and 1% moisture were produced by melting in a gas-fired cast iron vessel at 170° C.

The acid melt was then fed a rate of 100 parts per hour into a stainless steel tank where ammonia was added in sufficient quantity to raise the pH to 6.8, equivalent to an N:P atomic ratio of 1.75:1. The temperature was maintained at 155° C. by the feeding of solid cooled product to the tank at a rate of 40 parts per hour. The ammoniated melt was solidified by cooling on metal trays. Ammonia losses were measured throughout the operation and were found to be less than 1% of the nitrogen in the product.

Example 6

300 parts of a 0.5:1 N:P$_2$O$_5$ melt at pH 2.5 and 1% moisture was made up at 170° C. and ammoniated in a similar manner to the melt described in Example 5. The conditions were:

| | | |
|---|---|---|
| 0.5:1 N:P$_2$O$_5$ melt pH 2.5 | parts/hour | 100 |
| Solid cooled product pH 5.8 | do | 70 |
| Melt temperature in tank | °C | 165 |

Melt product pH 5.8.
Melt product NP atomic ratio _____ 1.3:1

Ammonia losses were found to be less than 0.1% of the nitrogen in the product.

We claim:

1. A process for preparing liquid melts comprising ammonium nitrate and ammonium phosphate wherein the ammonium phosphate has an N:P atomic ratio of from 0.9:1 to 2.0:1 and the melt has an N:P$_2$O$_5$ weight ratio of from 0.3:1 to 4.1:1 which comprises forming an acid mixture containing nitrate ions, phosphate ions, ammonium ions and hydrogen ions and 1.3% to 20% by weight of water at a temperature of 130° C. to 200° C. and a pH of 2.0 to 3.0, reducing the water content of the mixture to a level in the range 0 to 2% by weight based on the weight of the mixture, wherein the water is reduced, at least when the water content is below 3% by weight, by passing air through the mixture while maintaining the temperature of the mixture above its crystallisation point and finally treating the water-reduced mixture at a temperature of 120–200° C. with gaseous ammonia until the said N:P$_2$O$_5$ weight ratio is reached.

2. A process as claimed in claim 1 wherein the acid mixture has a pH in the range 2.2 to 2.8.

3. A process as claimed in claim 1 wherein the water content is reduced to a level in the range 0.1% to 1.2%.

4. A process as claimed in claim 1 wherein the water reduced mixture is treated with ammonia at a temperature of 150° to 185° C.

5. A process for preparing liquid melts comprising ammonium nitrate and ammonium phosphate wherein the ammonium phosphate has an N:P atomic ratio of from 0.9:1 to 2.0:1 and the melt has an N:P$_2$O$_5$ weight ratio of from 0.4:1 to 3.1:1 which comprises forming an acid mixture containing nitrate ions, phosphate ions, ammonium ions and hydrogen ions and 1.3 to 20% by weight of water at a temperature of 130° C. to 200° C. and a pH of 2.0 to 3.0, reducing the water content of the mixture to a level in the range 0 to 2% by weight based on the weight of the mixture, wherein the water is reduced, at least when the water content is below 3% by weight, by subjecting the mixture to a sub-atmospheric pressure, while maintaining the temperature of the mixture above its crystallisation point and finally treating the water-reduced mixture at a temperature of 120–200° C. with gaseous ammonia until, the said N:P$_2$O$_5$ weight ratio is reached.

6. A process for preparing liquid melts comprising ammonium nitrate and ammonium phosphate wherein the ammonium phosphate has an N:P atomic ratio of from 0.9:1 to 2.0:1 and the melt has an N:P$_2$O$_5$ weight ratio of from 0.3:1 to 4.1:1 which comprises treating with gaseous ammonia an acid mixture containing a nitrate component selected from the group consisting of ammonium nitrate and nitric acid, a phosphate component selected from the group consisting of ammonium phosphate and phosphoric acid, and water, at least one of the acids being present whereby an acid mixture containing nitrate ions, phosphate ions, ammonium ions and hydrogen ions and 1.3% to 20% by weight of water at a temperature of 130° C. to 200° C. and a pH of 2.0 to 3.0 is formed, reducing the water content of the mixture to a level in the range 0 to 2% by weight based on the weight of the mixture, wherein the water is reduced, at least when the water content is below 3% by weight, by passing air through the mixture while maintaining the temperature of the mixture above its crystallisation point and finally treating the water-reduced mixture at a temperature of 150–180° C. with gaseous ammonia until the said N:P$_2$O$_5$ ratio is reached.

7. A process for preparing liquid melts comprising ammonium nitrate and ammonium phosphate wherein the ammonium phosphate has an N:P atomic ratio of from 0.9:1 to 2.0:1 and the melt has an N:P$_2$O$_5$ weight ratio of from 0.3:1 to 4.1:1 which comprises adding previously prepared melt at a pH in the range 3.5 to 8.0 to an acid mixture containing a nitrate component selected from ammonium nitrate and nitric acid, a phosphate component selected from ammonium phosphate and phosphoric acid, and water at least one of the acids being present whereby an acid mixture containing nitrate ions, phosphate ions, ammonium inons and hydrogen ions and 1.3 to 20% by weight of water at a temperature of 130° C. to 200° C. and a pH of 2.0 to 3.0 is formed, reducing the water content of the mixture to a level in the range 0 to 2% by weight based on the weight of the mixture, wherein the water is reduced, at least when the water content is below 3% by weight, by passing air through the mixture while maintaining the temperature of the mixture above its crystallisation point and finally treating the water-reduced mixture at a temperature of 150–185° C. with gaseous ammonia until the said N:P$_2$O$_5$ ratio is reached.

8. A process for preparing liquid melts comprising ammonium phosphate nitrate which comprises mixing 1.0 to 5.8 parts by weight of ammonium nitrate as an 80–95% solution in water at a temperature of 150° to 200° C. with 3.0 to 1.0 parts by weight of phosphoric acid as a solution containing 70–100% by weight H$_3$PO$_4$, treating the resulting mixture with ammonia until a pH in the range 2.3 to 2.7 is attained, reducing the water content of the ammoniated mixture to a level in the range 0.2 to 1.0% by weight by passing air through the ammoniated mixture at a temperature above 120° C. and finally treating the substantially dehydrated mixture with gaseous ammonia until a pH in the range 3.5 to 8.0 is attained thereby forming a melt comprising ammonium phosphate nitrate having a temperature in the range 150° C. to 185° C.

References Cited

UNITED STATES PATENTS 3,231,364   1/1966   Booth et al. _____ 71—43 X

S. LEON BASHORE, *Primary Examiner.*

R. D. BAJEFSKY, *Assistant Examiner.*

U.S. Cl. X.R.

71—37, 43